(12) United States Patent
Pittman

(10) Patent No.: US 8,998,730 B2
(45) Date of Patent: Apr. 7, 2015

(54) DRIVESHAFT CONTAINMENT DEVICE

(76) Inventor: Paul F Pittman, Bloomington, MN (US)

( * ) Notice: Subject to any disclaimer, the term of this patent is extended or adjusted under 35 U.S.C. 154(b) by 0 days.

(21) Appl. No.: 13/405,474

(22) Filed: Feb. 27, 2012

(65) Prior Publication Data

US 2012/0220383 A1    Aug. 30, 2012

Related U.S. Application Data

(60) Provisional application No. 61/463,989, filed on Feb. 26, 2011.

(51) Int. Cl.
*F16C 1/26* (2006.01)
*F01M 13/04* (2006.01)

(52) U.S. Cl.
CPC ..................................... *F01M 13/04* (2013.01)

(58) Field of Classification Search
USPC ............... 464/177, 170, 53; 74/609; 403/349; 29/525.02
See application file for complete search history.

(56) References Cited

U.S. PATENT DOCUMENTS

| 1,260,080 | A | * | 3/1918 | Singer | 464/53 X |
| 1,320,582 | A | * | 11/1919 | Sperling | 464/53 |
| 1,464,882 | A | * | 8/1923 | Palmer | 464/53 X |
| 1,686,861 | A | * | 10/1928 | Kesler | 74/609 |
| 4,766,777 | A | * | 8/1988 | Hartz et al. | 464/177 X |
| 4,779,484 | A | * | 10/1988 | Poe | 74/609 X |
| 5,364,310 | A | * | 11/1994 | Taylor | 74/609 X |

\* cited by examiner

*Primary Examiner* — Gregory Binda
(74) *Attorney, Agent, or Firm* — Reed A. Duthler

(57) ABSTRACT

A driveshaft containment system and a method of its use. In preferred embodiments, the invention takes the form of a two component system including a first component mounted to a device such as a differential housing, coupled to driveshaft, and a second component comprising a tubular driveshaft containment housing. A driveshaft containment ring is preferably mounted to the forward end of the tubular housing which in turn is provided with a mechanism at its rearward end for rotationally engaging and disengaging the first component. The first and second components are also provided with a mechanism for preventing relative rotational movement of the first and second components while engaged with one another.

16 Claims, 6 Drawing Sheets

DRIVESHAFT CONTAINMENT DEVICE

RELATED APPLICATION

This application claims priority from U.S. provisional Patent Application No. 61/463,389 for a Driveshaft Containment Device, by Paul Pittman, filed Feb. 26, 2011, incorporated herein by reference in its entirety.

FIELD

This invention generally relates to a device for containing a vehicle drive shaft in the event of a failure of a universal joint. The invention relates particularly to containment of the portion of a driveshaft adjacent to a differential or other driveline housing in a motor vehicle.

BACKGROUND

It is known to provide containment loops at the forward and rearward ends of drive shafts in motor vehicles to retain the ends of the drive shafts in the event of failure or breakage of a universal joint. The NHRA (National Hot Rod Association), in particular, mandates the use of both front and rearward driveshaft containment loops in several classes of vehicles used for quarter mile drag racing. A wide variety of designs of such loops are currently available. In particular, those manufactured or sold by Scribner Welding and Distributing, Mark Williams Enterprises and Jerry Bickel Race cars, Inc, take the form of loops mounted to and completely supported by the forward portion of the differential housing or carrier (the terms are used interchangeably herein). These devices are also known as "rearward driveshaft enclosures".

Such devices typically comprise a ring-shaped flange attached to the front of the rearward differential housing at several points around its circumference. In some designs, the device includes a tubular shield extending forward of the differential housing and surrounding the adjacent universal joint. A containment loop is typically provided located somewhat forward of the universal joint, at the forward end of the tubular shield (if provided). The loop may be coupled to the flange by means of a set of tubes extending rearward to the flange. Alternatively, the flange may be provided with forward extending projections which are coupled to the side of the tubular housing or the tubular housing may be provided with a second flange at its rearward end, coupled to the flange on the driveshaft housing. These designs generally employ multiple separate connector mechanisms associated with various attachment points located spaced around the circumference of the flange attached to the driveshaft housing.

SUMMARY OF THE INVENTION

In the context of drag racing, it is sometimes necessary to disconnect the driveshaft from and reconnect the driveshaft to the same or a substitute differential between successive races during a single event. Time between successive rounds can be short, and many other tasks may also need to be performed. To this end, the ability to quickly and simply remove and replace these rearward driveshaft enclosures is desirable in order to make best use of the available time. The present invention is directed toward accomplishing this desired result without compromising structural integrity of the driveshaft enclosure as mounted.

The present invention accomplishes the above desired result by providing a driveshaft enclosure which provides a first plurality of multiple attachment locations arrayed around the forward end of the differential housing to ensure structural integrity while only requiring disconnection of a lesser number of connector mechanisms and/or performance of a lesser number of disconnection operations to release the enclosure from the differential housing.

In preferred embodiments, the invention takes the form of a two component system including a first component mounted to the differential housing and a second component comprising a driveshaft containment ring. The driveshaft containment ring is preferably mounted to the forward end of a tubular housing which in turn is provided with a mechanism at its rearward end for rotationally engaging and disengaging the first component. The first and second components are also provided with a mechanism for preventing relative rotational movement of the first and second components while engaged with one another.

In a preferred embodiment, various versions of the first component are available, each having a configuration adapted for use with a specific type of differential housing or carrier. However, the rotational engagement mechanism of the first and second components is preferably the same for each of the first components, whereby a single configuration of the second component is usable with all versions of the first component. By this arrangement, a user may purchase individual first components for each of several differential housings, while only needing to purchase a single second component, usable with all. By this means, expense associated with the replacement or exchange of differential housings can be correspondingly reduced.

In a preferred embodiment, the first component takes the form of a generally ring-shaped flange mountable to the front portion of a differential housing or case, typically by means of bolts or nuts arranged to mount to corresponding pre-existing threaded bores in or studs extending from the font portion of the differential housing. To this end, the flange will typically be provided with a plurality of holes at locations extending around the flange and aligned with the threaded bores or studs of the differential housing. In some cases, it is understood that additional bores or studs may have to be provided on the housing, if needed to provide structural rigidity.

The first component (flange) is also preferably provided with a series of slots arrayed in a circular pattern extending around the flange. The rearward end of the tubular housing of the second component is preferably provided with a corresponding series of tangs, insertable within the slots. The tangs are preferably formed as integral extensions of the tubular housing. Each tang has a base that extends rearward from the tubular housing a free end that extends circumferentially, clockwise or counterclockwise, for distances less than or equal to the corresponding lengths of the slots. By this mechanism, the tangs may be simultaneously inserted into the slots and, with only a slight rotation of the tubular housing thereafter, the second component is simultaneously engaged with the first component at a plurality of locations to provide structural integrity.

After rotation of the tubular housing into engagement with the flange (rotational engagement of the first and second components) the first and second components are further engaged with each other to prevent unintentional counter rotation and disengagement of the components. In preferred embodiments this is accomplished by means of a single fastening mechanism which rotationally fixes the tubular housing relative to the flange. Preferably, this mechanism is located generally on the top center portion of the containment device as installed, so that it may readily be accessed from either side of the car optionally through an access opening through the floor of the car, provided, for example, by means of a removable panel In addition to simplicity of installation and removal, the preferred embodiment discussed above provides a savings in over-all weight, due to the fact that the tubular housing itself includes the mechanisms (tangs) for attachments to multiple locations around the flange, without the necessity of additional structures such as tubes, additional flanges, extensions from the flange, nuts, bolts and the like. Fabrication of the device is also correspondingly simplified. The preferred embodiment also thus also minimizes the number of removable components (nuts, bolts and the like) which might be misplaced during sometimes hectic activity between successive rounds of racing.

BRIEF DESCRIPTION OF THE DRAWINGS

Aspects and features of the present invention will be appreciated as the same becomes better understood by reference to the following detailed description of the embodiments of the invention when considered in connection with the accompanying drawings, wherein.

DETAILED DESCRIPTION

In the figures as described below, numbered components on each drawing correspond to identically numbered components on the other drawings. All numbered components will not be described separately for each figure.

Figure 1:
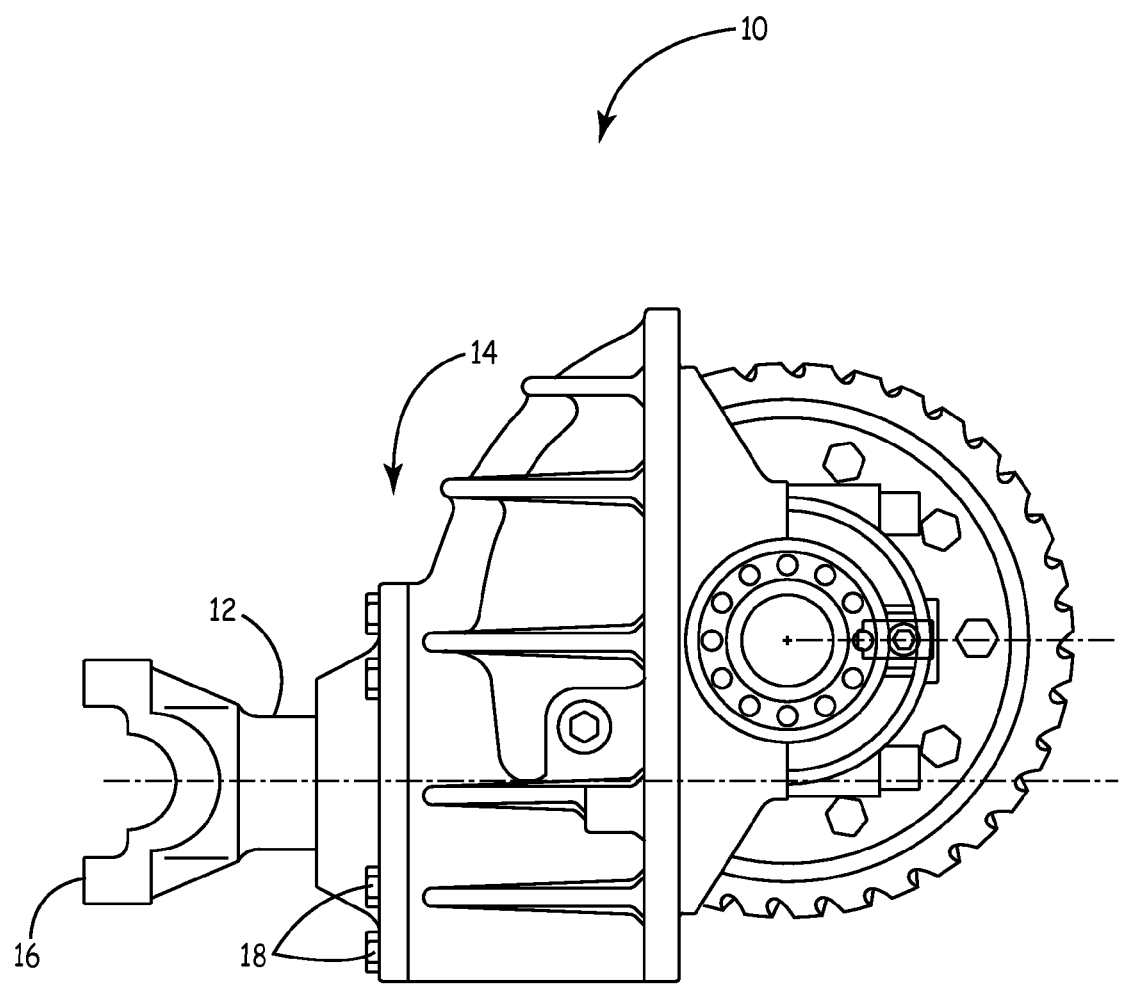
FIG. 1 is a side view of a differential assembly of one type appropriate for use with the present invention

FIG. 1 is a side view of a differential assembly 10 of one type appropriate for use with the present invention. The input shaft 12 can be seen extending forward of the differential housing 14, carrying one yoke 16 of the universal joint which couples the input shaft 12 to the rear end of the driveshaft (not illustrated).

The forward surface of the differential housing is provided with a plurality of bolts 18, distributed in corresponding threaded bores circumferentially around the forward surface of the housing 14, encircling the input shaft 12. In some preferred embodiments, these bolts or longer, substitute bolts are used to secure the flange of the present invention to the differential housing. In alternative embodiments, the differential housing may be provided with forward extending studs, with corresponding nut used to secure the flange. If the forward surface of the differential housing is not provided with bores or studs, the flange may optionally be provided with rearward extensions to engage side surfaces of the differential housing.

Figure 2:
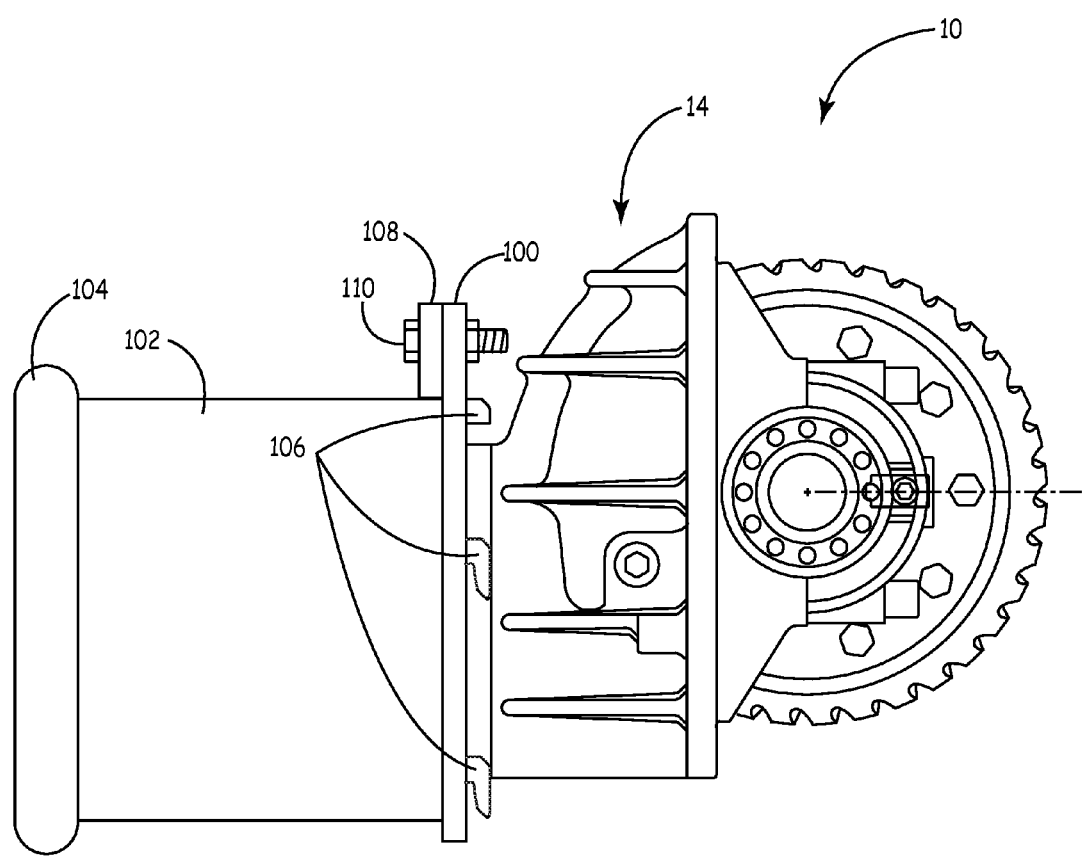
FIG. 2 is a side view of the differential assembly FIG. 1 with a preferred embodiment of the invention attached thereto.

FIG. 2 is a side view of the differential assembly FIG. 1 with a preferred embodiment of the invention attached thereto. In this view, the flange 100 is secured to the front surface of the differential housing 14 by means of the bolts 18 (FIG. 1). The tubular housing 102 extends forward from the flange, terminating at its forward end with the containment loop 104. Tangs 106 are visible extending through corresponding slots in flange 100 and retain the tubular housing to the flange as discussed above.

An outwardly extending tab 108 is secured to the tubular housing 102 and is aligned with a corresponding tab on the flange 100 when the tubular housing is rotated into engagement with the flange as described above. A nut and bolt 110 are shown extending through corresponding bores through the flange 100 and the tab 108, rotationally fixing the tubular housing with respect to the flange. The tabs on the flange and tubular housing are shown as extending upward from the assembly, located generally centrally as discussed above to allow access from both sides. The nut and bolt 110 may be replaced with another type of fastener, such as a quick release pin or the like.

The containment loop 104 may be fabricated, for example, of chrome-molly alloy steel, and may take the form of two semi-circular segments of ⅞" OD, tubing, welded end to end to provide a loop of approximately 7" in outer diameter. The loop is then welded to the forward end of the tubular housing. Dimensions and materials of course may be altered and optimized to suit particular applications. The specific example described herein is merely exemplary. Similarly sized components of titanium, for example, may be substituted.

As illustrated, the containment loop is located forward of the universal joint coupling the driveshaft to the input shaft 12 (FIG. 1), so that in case of failure of the universal joint, the rearward end of the driveshaft will be retained within the loop.

Figure 3:
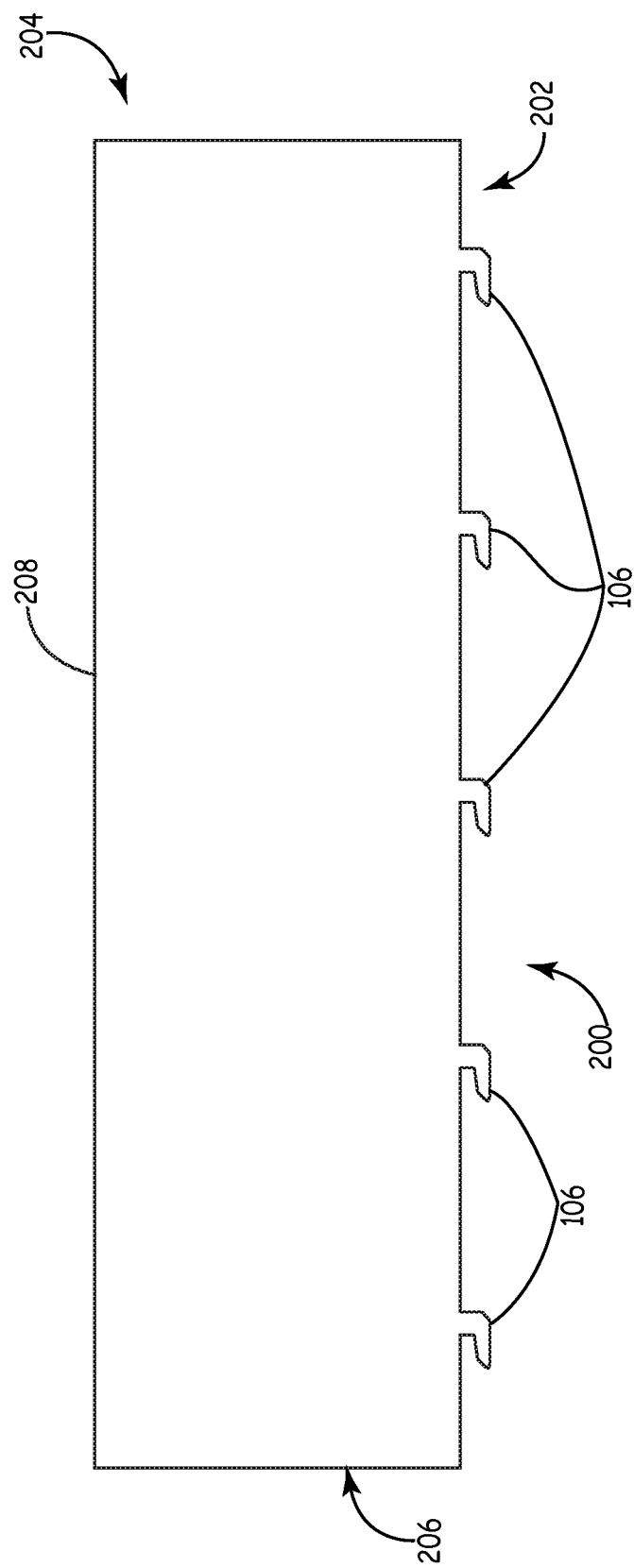
FIG. 3 is a plan drawing of the sheet of metal used to fabricate the tubular housing of the present invention.

FIG. 3 illustrates the sheet 200 of metal from which the tubular housing is manufactured. This sheet may also be fabricated of chrome-moly alloy steel or other suitable material. The tangs 106 are seen extending from the edge 202 of the sheet 200 that will form the rearward edge of the tubular housing. The tangs are preferably formed integral with the sheet, for example by cutting the sheet as illustrated from a larger sheet by laser of plasma cutter or other appropriate mechanism. The sheet is then rolled into the form of a tube, with edges 204 and 206 welded to one another. Edge 208 forms the forward edge of the tubular housing and is welded circumferentially to the containment loop as described above. While a tubular housing formed of a single rolled sheet as described herein is the preferred embodiment, a tubular housing formed of multiple individual tubes or rods as employed in some prior art rearward driveshaft enclosures may be substituted in some cases.

The sheet 200 as shown is sized to provide a tubular housing of approximately 6" in diameter and 6" in length. Dimensions and materials of course may be altered and optimized to suit particular applications. The specific example described herein is merely exemplary. As shown, the sheet is provided with five tangs 106, but this number may also need to be to be altered to allow optimization for particular applications.

In some embodiments, the tubular housing may be provided with an opening though which a sensor (e.g. speed sensor) or conductors associated therewith may extend. This opening (not illustrated) is preferably takes the form of a slot or notch in the rearward edge of the sheet, so that the sensor may remain attached when the tubular housing is detached from the flange. The slot or notch may conveniently be located to that it resides at the 9:00 position as viewed from the front of the assembled device.

Figure 4:
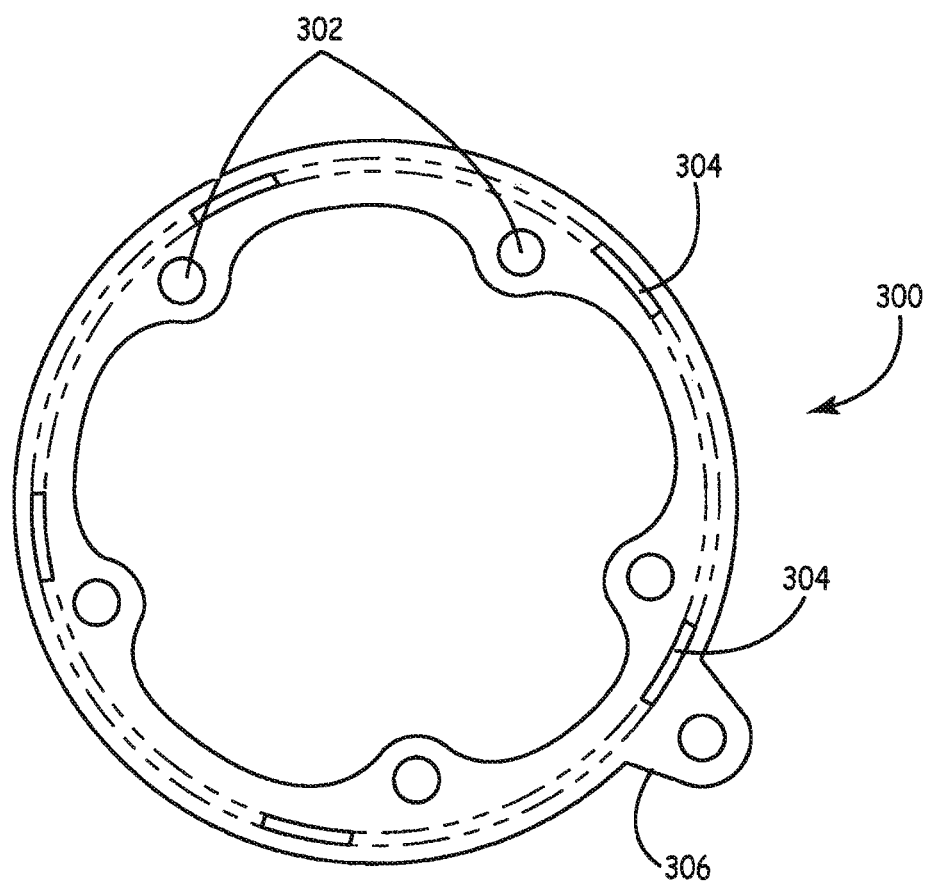
FIG. 4 is a plan drawing of first embodiment of a flange according to the present invention.

FIG. 4 is a plan view of a first embodiment of a flange 300 according to the present invention, corresponding to flange 100 (FIG. 2). The flange may also be fabricated of chrome-moly alloy steel or other suitable material. As illustrated, the flange is provided with five bores 302 extending therethrough allowing for attachment to the forward surface of a corresponding differential housing provided with five bolts or studs. Five slots 304 are also illustrated, arranged to allow insertion of the tangs 106 (FIGS. 2 and 3) as discussed above. Tab 306 extends outwardly from the flange also provided with a bore therethrough. Tab 108 (FIG. 2) is welded to sheet 200 (FIG. 3) after it is welded to form a tube and in a location such that the bore therethrough aligns with the bore through tab 306 after rotation of the tubular housing 102 (FIG. 2) into engagement with the flange, as discussed above.

Figure 5:
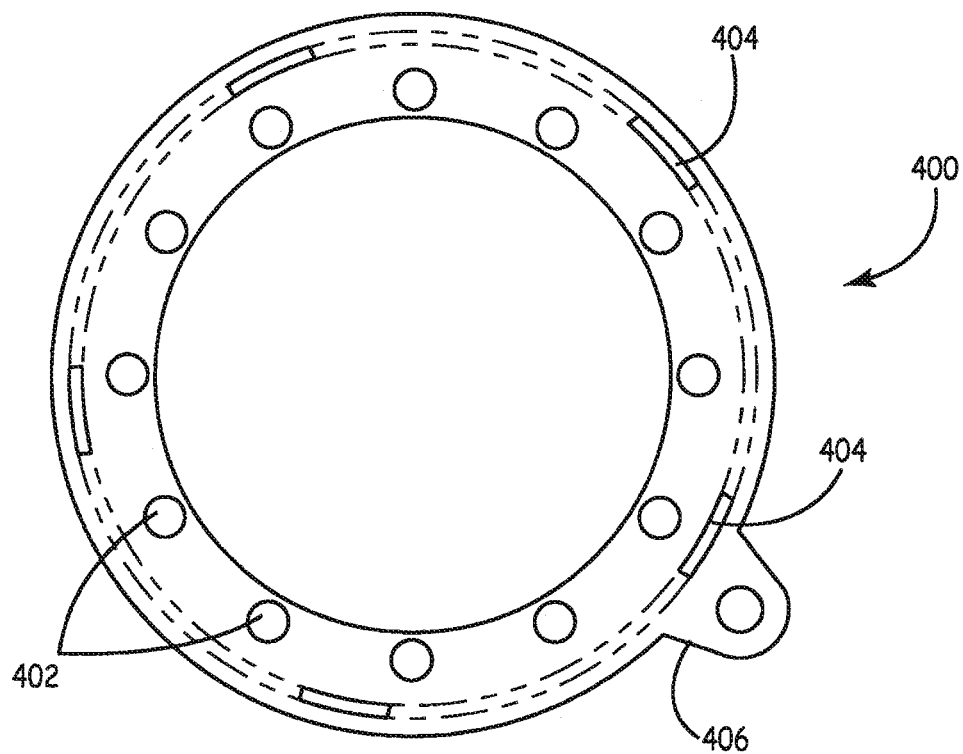
FIG. 5 is a plan drawing of second embodiment of a flange according to the present invention.

FIG. 5 is a plan view of a second embodiment of a flange 400 according to the present invention, corresponding to flange 100 (FIG. 2). The flange may also be fabricated of chrome-moly alloy steel or other suitable material. As illustrated, the flange is provided with twelve bores 402 extending therethrough allowing for attachment to the forward surface of a corresponding differential housing provided with five bolts or studs. Five slots 404 are also illustrated, arranged to allow insertion of the tangs 106 (FIGS. 2 and 3) as discussed above. Tab 406 extends outwardly from the flange also provided with a bore therethrough. Tab 108 (FIG. 2) is welded to sheet 200 (FIG. 3) after it is welded to form a tube and in a location such that the bore therethrough aligns with the bore through tab 406 after rotation of the tubular housing 102 (FIG. 2) into engagement with the flange, as discussed above.

Figure 6:
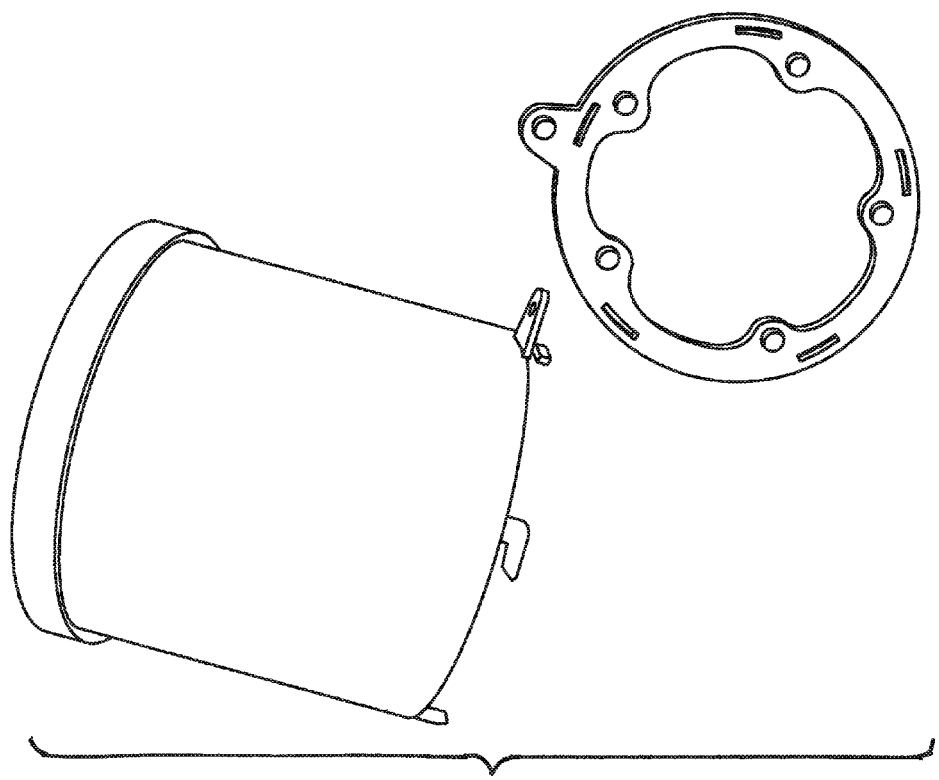
FIG. 6 is a perspective view of a preferred embodiment of both components of the present invention, un-assembled.

FIG. 6 is a perspective view of the containment device components, unassembled.

While the preferred embodiment as disclosed herein is adapted for use in containing the rearward universal joint adjacent the differential, the device may also be adaptable for use in other locations, adjacent other driveline devices such as the rear end of a transmission or the like. As such, the above disclosure should be considered exemplary of the invention as claimed below.

In conjunction with the above disclosure, I claim the invention as set forth below.

I claim:

1. A driveshaft containment system for a vehicle having a driveshaft coupled to another driveline device, comprising:
    a first component mounted to the driveline device and a second component comprising a tubular housing containing a portion of the driveshaft and having first and second open ends, wherein the first and second components are provided with a mechanism for rotationally engaging and disengaging the first end of the tubular housing from the first component and wherein the first and second components are further provided with a single mechanism for preventing relative rotational movement of the first and second components while engaged with one another;
    wherein the rotational engagement mechanism comprises a set of projections extending from the first end and a corresponding set of openings through the first component, into which the projections are inserted; and
    wherein the projections comprise a set of tangs extending from a set of locations around the first end of the tubular housing and having free ends extending circumferentially from those locations and wherein the openings comprise slots configured to simultaneously allow passage of the tangs therethrough.

2. The system of claim 1, further comprising a driveshaft containment ring mounted to the tubular housing.

3. The system of claim 2 wherein the containment ring is located at the second end of the tubular housing.

4. The system of claim 1, wherein the driveline device comprises a differential housing.

5. The system of claim 4, wherein the first end is a rearward end of the tubular housing and the second end is a forward facing end of the tubular housing.

6. The of claim 1 wherein the mechanism for preventing rotational movement comprises a tab on the tubular housing having a first bore therethrough and a corresponding second bore through the first component, through which a retaining mechanism may be inserted.

7. A system according to claim 1 wherein the retaining mechanism comprises a nut and bolt.

8. A system according to claim 1 wherein the driveshaft is coupled to the driveline component by means of a joint and wherein the joint is located within the tubular housing.

9. A method of mounting a driveshaft containment system, comprising:
    mounting a first component to a driveline device coupled to the driveshaft; and
    mounting a second component around a portion of the driveshaft, the second component comprising a tubular housing having first and second open ends, the mounting comprising rotationally engaging the first end of the tubular housing with the first component and by thereafter employing a single mechanism for preventing relative rotational movement of the first and second components while engaged with one another;
    wherein the rotational engaging comprises mechanism comprises engaging a set of projections extending from the first end and a corresponding set of openings through the first component, into which the projections are inserted; and
    wherein the projections comprise a set of tangs extending from a set of locations around the first end of the tubular housing and having free ends extending circumferentially from those locations and wherein the openings comprise slots configured to simultaneously allow passage of the tangs therethrough.

10. The method of claim 9, wherein a driveshaft containment ring is mounted to the tubular housing.

11. The method of claim 10 wherein the containment ring is located at the second end of the tubular housing.

12. The method of claim 9, wherein mounting the first component comprises mounting the first component to a differential housing.

13. The method of claim 12, wherein the first end is a rearward end of the tubular housing and the second end is a forward facing end of the tubular housing.

14. The method of claim 9 wherein the mechanism for preventing rotational movement comprises a tab on the tubular housing having a first bore therethrough and a corresponding second bore through the first component, through which a retaining mechanism may be inserted.

15. The method of claim 14 wherein employing the retaining mechanism comprises passing a bolt through the first bore and the second bore and securing it with a nut.

16. The method of claim 9 wherein the driveshaft is coupled to the driveline device by means of a joint and wherein mounting the second component comprises mounting it around the joint.

* * * * *